(No Model.)
C. K. ROBINSON.
VEHICLE REACH.
No. 271,520. Patented Jan. 30, 1883.
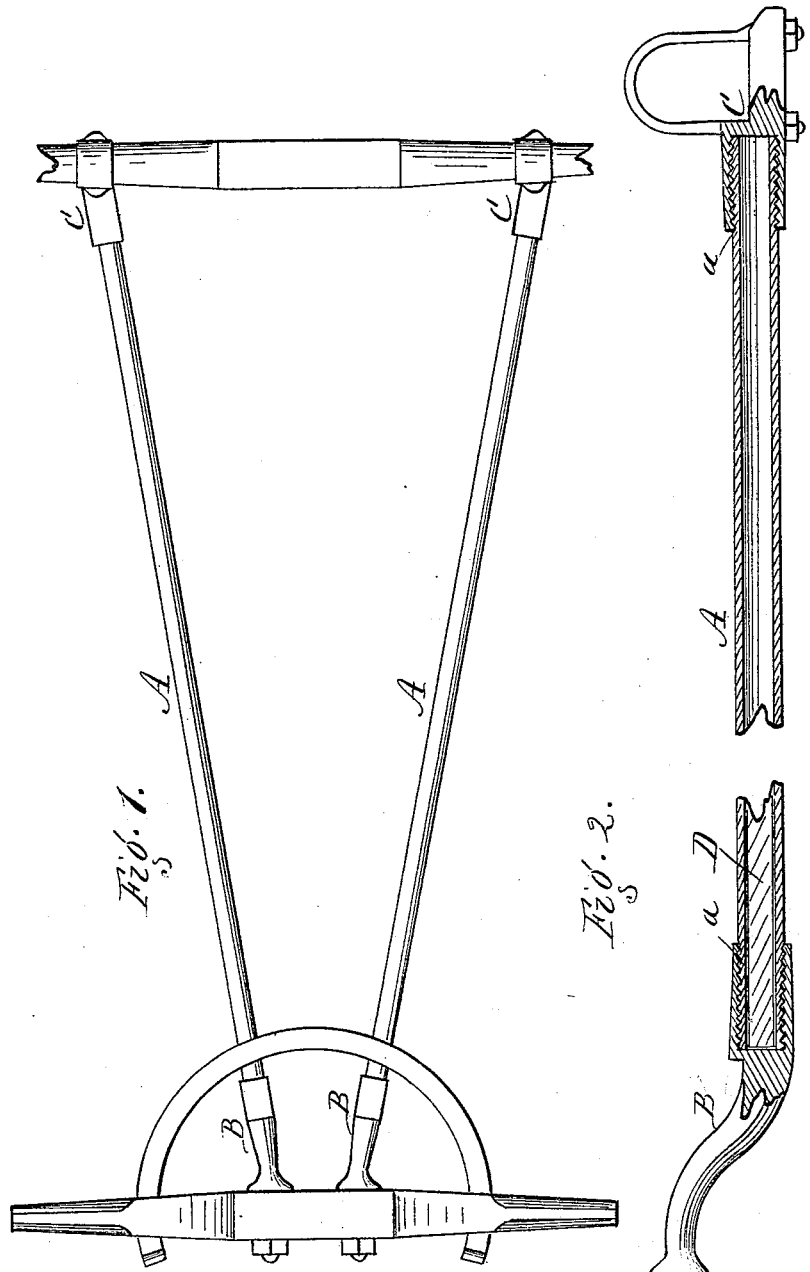

UNITED STATES PATENT OFFICE.

CHARLES K. ROBINSON, OF LYONS, NEW YORK, ASSIGNOR TO LEMAN HOTCHKISS AND NELLIE L. HOTCHKISS, BOTH OF SAME PLACE.

VEHICLE-REACH.

SPECIFICATION forming part of Letters Patent No. 271,520, dated January 30, 1883.

Application filed July 5, 1882. (No model.)

*To all whom it may concern:*

Be it known that I, CHARLES K. ROBINSON, of Lyons, Wayne county, New York, have invented a certain new and useful Improvement in Vehicle-Reaches; and I do hereby declare that the following is a full, clear, and exact description of the same, reference being had to the accompanying drawings, in which—

Figure 1 is a plan of a double reach attached to the axle and head-block of a vehicle, and showing my improvement. Fig. 2 is a longitudinal section, partially in elevation, of the reach on an enlarged scale.

In general features this invention is similar to that patented by me April 25, 1882. A tubular reach consisting of a section of gas-pipe is used, and solid bearing ends are fitted thereto, as in that case.

My present invention consists of a tubular reach consisting of a section of gas-pipe with screw-threads cut upon its ends, and solid metallic bearing ends fitted with sockets having female threads, into which the ends of the gas-pipe screw. By this means two important results are obtained—first, the bearing ends can be made of malleable iron, thus insuring cheapness; and, second, the reach can be lengthened or shortened by simply screwing it in or out in the bearing ends, thereby enabling the bearing ends to be adjusted exactly to place on the axle and head-block to which they are attached.

In the drawings, A shows the reach, which is made of a piece of gas-pipe or other tube. On its ends are cut screw-threads *a a*.

B and C are the solid metallic bearing ends, provided with bolts and clips for attaching to the wood-work. These ends are made of malleable iron, and are provided with sockets, in which are cut female threads corresponding with the threads *a* on the ends of the reach. The ends of the reach simply screw into the ends of the bearings, and the latter are attached to the wood—one to the rear axle and the other to the front head-block or bolster.

By the means above described the bearing ends B C can be made of malleable iron, whereas in my former invention they had to be made of wrought or forged iron in order to be welded to the ends of the tube. The cost is therefore greatly reduced. By this means, also, the reach can be lengthened and shortened at pleasure, thus adapting it to gearing of different lengths, and allowing the bearing ends to be drawn up and fitted exactly to the woodwork, which is sometimes difficult to do where the reach is non-adjustable. The reach is lengthened or shortened by simply screwing it in or out of the bearings.

If desired, a wood or other filling, D, may be used inside the tube.

I do not claim a reach having its front end connected with a socket by a screw-thread; but

I claim—

A reach consisting of a central section having screw-threads at both ends and two end bearings, into which the ends of the central section screw, whereby the reach can be lengthened or shortened by turning the central section, and without disconnecting the reach, as herein shown and described.

In witness whereof I have hereunto signed my name in the presence of two subscribing witnesses.

CHARLES K. ROBINSON.

Witnesses:
R. F. OSGOOD,
JACOB SPAHN.